(12) United States Patent
Thaler et al.

(10) Patent No.: US 6,617,571 B2
(45) Date of Patent: Sep. 9, 2003

(54) ROTARY ENCODER

(75) Inventors: Josef Thaler, Traunreut (DE); Hermann Meyer, Schneizlreuth (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/891,040

(22) Filed: Jun. 25, 2001

(65) Prior Publication Data

US 2002/0000512 A1 Jan. 3, 2002

(30) Foreign Application Priority Data

Jun. 27, 2000 (DE) .......................... 100 31 302

(51) Int. Cl.$^7$ ................................ G01D 5/34
(52) U.S. Cl. ...................... 250/231.13; 250/231.14
(58) Field of Search ................ 250/231.13, 231.14, 250/231.15, 231.16, 231.17, 231.18, 232, 233, 566; 341/11, 13, 15; 324/207.23, 207.25

(56) References Cited

U.S. PATENT DOCUMENTS 4,899,145 A * 2/1990 Okuda et al. .............. 314/15

2002/0145108 A1 * 10/2002 Rodi ..................... 250/231.14

FOREIGN PATENT DOCUMENTS

EP         0776065         1/2000

OTHER PUBLICATIONS

Prospect of the firm "Dr. John Heidenhain GmbH," 1997, Jul., p.p. 52, 54.

* cited by examiner

*Primary Examiner*—Kevin Pyo
(74) *Attorney, Agent, or Firm*—Sidley Austin Brown & Wood, LLP

(57) ABSTRACT

A rotary encoder including a housing having a wall which forms a bottom of the housing and has a center and at least one opening, a cover for closing the at least one opening, with the housing wall having an attachment region which encloses the wall center and has at least one attachment point at which the cover is attached to the housing wall, and a fastening element for securing the cover to the housing wall and rotatable at the attachment region to provide for connection of the fastening element with the at least one attachment point.

11 Claims, 4 Drawing Sheets

ROTARY ENCODER

BACKGROUND OF THE INVENTION

1. Field of the Invention

The present invention relates to a rotary encoder including a housing having a bottom wall provided with at least one opening, and a cover for closing the opening.

2. Description of the Prior Art

Rotary encoders are generally used for measuring the rotational movement of a rotatable body, in particular, a shaft, over one or several revolutions. The data characterizing the rotational movement of the rotatable body can be acquired incrementally or absolutely. When the rotary encoders are associated with racks and tooth gears or with threaded spindles, they can be used for measuring the linear movement.

Actuation voltage is fed to a rotary encoder via a connection cable which also serves for transmitting the measurement signal to servo-electronics. The housings of conventional rotary encoders are provided with an opening through which the connection cable is inserted and is connected with suitable electrical connection means located in the housing.

European Patent EPO 776 065 BI discloses a rotary encoder with a pot-shaped, hollow cylindrical housing having an opening provided in its bottom and insuring access to a connection plug for the connection cable, to a strain-relief device for the cable, and to connection means which connects the encoder shaft with a to-be-measured rotatable body. The opening is closed with a cover which is hingidly connected with the housing and, for covering the opening, snaps behind a projection. The snap connection between the cover and the housing is particularly stressed when the rotary encoder is subjected to vibrations or when a strong tension load is applied to the connection cable.

A publication "Positional Encoders for Electrical Drives" (July, 1997) of the firm Dr. Johannes Heidenhain GmbH, an assignee herein, discloses a rotary encoder with a stator coupling for mounting in motors. The encoder housing has a circular rear wall and a large-surface opening formed in the rear wall and providing access to connection means for connecting the encoder shaft with to-be-measured rotatable body and to electrical connector means of the encoder.

The opening is covered with a cover which is connected to the rear wall of the housing with a fastening screw provided in the region of the outer edge of the rear wall. The screw connection is subjected to a substantial load when the rotary encoder is subjected to vibrations.

An object of the present invention is to provide a rotary encoder which would insure a reliable and durable attachment of the cover to the housing.

SUMMARY OF THE INVENTION

This and other objects of the present invention, which will become apparent hereinafter, are achieved by providing in the housing rear wall, an attachment region which encloses the wall center and the opening(s), which provide(s) access to the connection means that connects the encoder shaft with the to-be-measured body, and the electrical connector, and which has an attachment point at which the fastening element is rotatably supported for securing the cover to the housing wall.

Experiments have shown that providing an attachment region that encloses the center of the rear wall and at which the fastening element is rotatably supported, insures a vibration-free attachment of the cover to a circular housing wall.

The solution according to the present invention can also be advantageously used when there is provided, in the housing wall, an opening, which is located eccentrically with respect to the wall center or is located outside of the center and which should be covered by the cover. In this case, this opening is covered by a cover that is secured to the housing wall by a fastening element centrally supported on the housing wall.

Behind at least one opening in the housing wall, an electrical connection element of the encoder is arranged. The connection element is accessible through the opening behind which it is arranged and therefore, can be connected with a mating connection element of the connection cable at least partially located outside of the housing.

Behind an opening in the housing wall, connection means or a connection element for connecting the encoder shaft with a code disc supported thereon with a to-be-measured body is located, which permits to actuate this connection element from outside of the housing.

In accordance with one embodiment of the present invention, the electrical connection element and the connection element for connecting the encoder shaft with to-be-measured body are associated with two separate openings which are formed in the housing wall and are closed by the same cover. In this case, the opening associated with the electrical connection element is located preferably outside of the housing wall center, with the opening associated with connection element being centrally located in the housing wall.

In accordance with another embodiment of the present invention, both the electrical connection element and the connection element for connecting the encoder shaft with a to-be-measured member are associated with one and the same opening formed in the housing wall and covered by the cover.

When a circular opening centrally located in the housing wall is associated with the connection element for connecting the encoder shaft with a to-be-measured body, this circular opening can also be used as an attachment point for securing the cover to the housing wall. To this end, the housing wall is formed with a punched-out hollow cylindrical section concentric with the circular opening. The hollow cylindrical section forms an attachment element which provides for securing the cover to the housing wall. The hollow cylindrical section can be provided, e.g., with an inner or outer thread.

Such a double function of a centrally located, circular opening, (namely, providing access to the shaft connection element, on one hand, and serving as an attachment point, on the other hand) is also then possible when it is formed not as a separate opening but is adjoined by a further, located off-center, opening that provides, e.g., access to the electrical connection element of the encoder. In this case, the centrally located, circular opening and the further opening, which is located outside of the housing wall center, form two sections of a common opening arranged eccentrically with respect to the housing wall center. In this case, it is important that the centrally located, circular opening be provided over an angle of more than 180° with a thread or other fastening means, e.g., a bayonet connection cooperating with a mating element rotatable with respect to the axis of the centrally located, circular section of the common opening.

As in the conventional rotary encoders, in the inventive rotary encoder, there is provided a strain-relief device which is covered by the cover and becomes accessible upon the cover being removed.

In accordance with the present invention, the strain-relief device includes a receptacle provided in the housing wall for clampingly receiving a section of the connection cable.

According to one embodiment of the present invention, the receptacle is formed as a recess in which a section of the connection cable formlockingly engages.

In addition, the cover itself can be provided, at its side facing the housing wall, with a formation for receiving a section of the connection cable.

The section of the connection cable, which is received in the strain-relief device, has an electrically conductive sleeve, in particular a crimp sleeve, that provides an electrical connection between the sheath of the connection cable and the housing wall which preferably is formed of an electrically conductive material.

For securing the cover to the housing wall, there can be provided a fastening element separately from the cover, e.g., a screw. However, preferably, the fastening element is retained on the cover without a possibility of being lost. The fastening element can be rotatably held in a corresponding opening, e.g., by a retaining ring which prevents axial displacement of the fastening element from the cover.

As it has already been mentioned above, instead of a threaded connection, a bayonet connection can be used for securing the cover to the housing wall. With the bayonet connection as with the threaded connection, the fastening element is rotated relative to the housing wall at a corresponding attachment point to provide connection between the fastening element and the attachment point, whereby the cover is secured to the housing wall.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
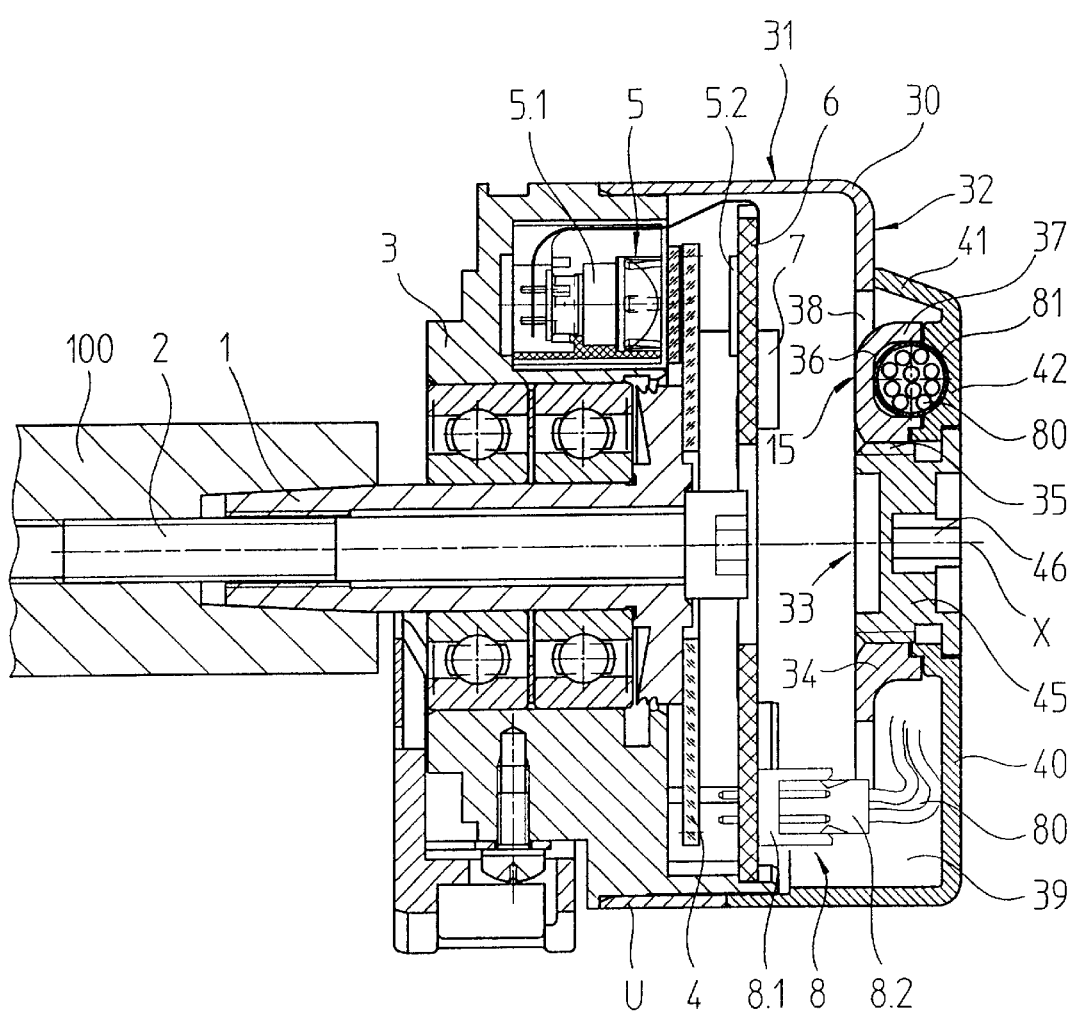
FIG. 1 an axial cross-sectional view of a rotary encoder according to the present invention.
Figure 2:
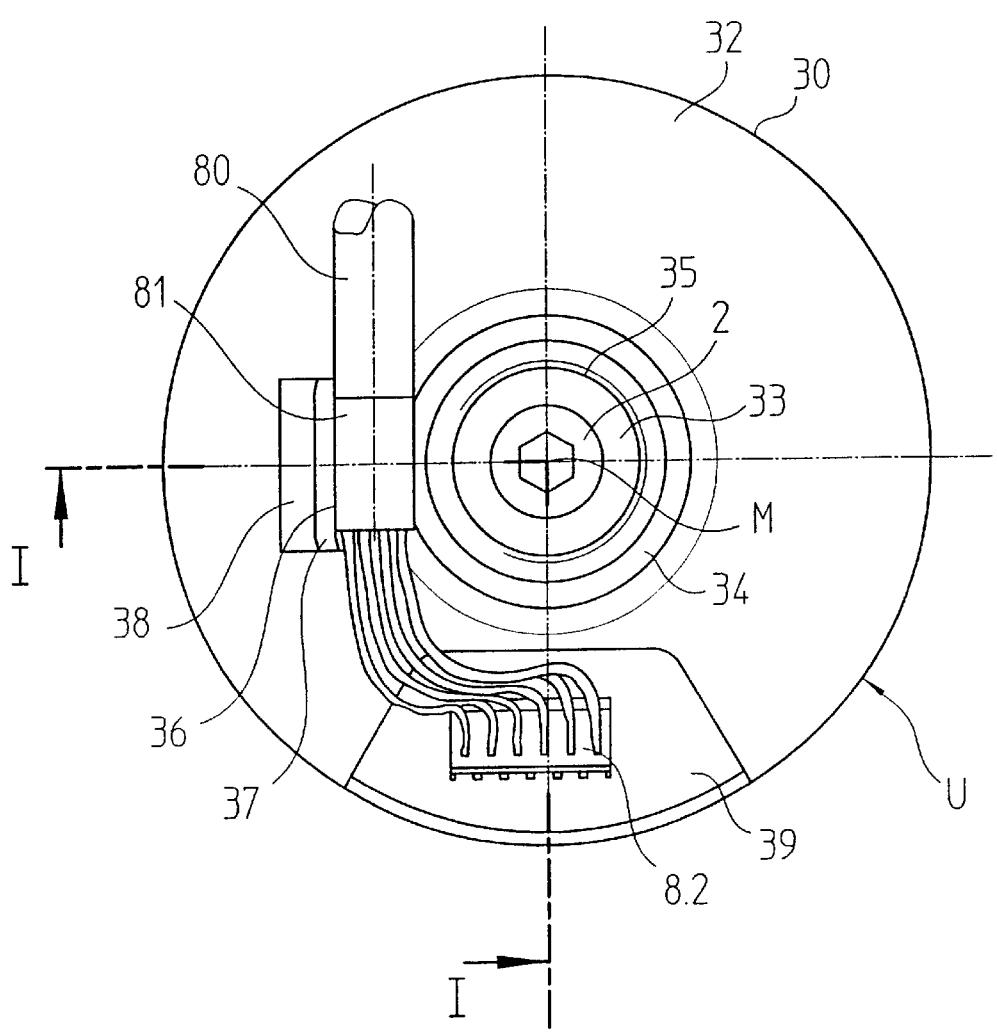
FIG. 2 a plan view of the rotary encoder shown in FIG. 1, with the cover being removed.

A rotary encoder according to the present invention, which is shown in the drawings, in particular in FIGS. 1–2, is designed for acquiring data connected with rotary movement of a rotatable body. FIGS. 3–4 and 5–6 show two embodiments of the encoder housing the rear wall of which has a plurality of openings which are covered by a cover that is centrally secured to the rear wall.

The rotary encoder includes a shaft 1 connectable with a body 100 the data of the rotational movement of which are to be acquired. The connection of the shaft 1 with the body 100 is effected with a screw 2 that extends through the shaft 1.

A base 3 connects the rotary encoder with another body. The rotatable body 100 can represent, e.g., an engine shaft, and the another body can represent, e.g., the engine housing.

The shaft 1 is rotatably supported in the base 3 in per se known manner. A code disc 4 is secured on the shaft 1 and/or the shaft 1 can drive, via a gear, one or more code disc(s). In the discussed embodiment, the code disc 4 is photoelectronically scanned by a scanning device 5. The code disc 4 is scanned by transmission of light therethrough. To this end, there are provided a light source 5.1, which is arranged in the base 3 and is located on one side of the code disc 4, and a detector 5.2 arranged on another, opposite side of the code disc 4. The detector 5.2 is supported on a printed circuit board 6 on a side of the board 6 adjacent to or facing the code disc 4. On the opposite side of the board 6, there is provided an electrical signal shaping component 7, e.g., for amplifying and digitizing the scanning signal generated by the detector 5.2. A component 8.1 (electrical connection element) of a plug connector 8 is also supported on the board 6. A corresponding component 8.2 (mating electrical connection element) of the plug connector 8 is connected with a connection cable 80 leading outside.

For protection of the rotary encoder, there is provided a pot-shaped housing 30 which is secured to the base 3 by being clamped thereon. In the discussed embodiment, the housing 30 is press-fitted on the base 3.

Inside the housing 30, there is provided a device 15 for strain relief of the cable 80. The device 15 includes a receptacle 36 which forms part of the housing 30 and in which a member 81, which is fixedly connected with the cable 80, engages. Thereby, a formlocking connection is provided between the housing 30 and the connection cable 80 or the member 81. The formlocking connection between the cable 80 (member 81) and the housing 30 prevents the transmission of a pulling force, which is applied to the cable 80 outside of the rotary encoder, to the plug connector 8.

The member 81, which is secured on the connection cable 80, is formed, preferably, as a crimp sleeve located in the receptacle 36 over its entire length. The crimp sleeve 81 is electrically conductive and is clamped in the receptacle 36 to insure a reliable and simple securing of the crimp sleeve 81 in the receptacle 36. The receptacle 36 is adapted to the shape of the crimp sleeve 81 so that the crimp sleeve 81 can be snapped thereinto. The crimp sleeve 81, in this way, provides an electrical connection between the sheath of the connection cable 80 and the housing 30. In this way, the housing 30 is connected, in a simple manner, by the cable 80 with a reference potential of servo-electronics (counter, control). The housing 30 is formed, e.g., of an electrically conductive plastic material or a plastic material with an electroconductive coating, and is formed, advantageously, by injection molding. The receptacle 36 is so arranged in the housing 30 that the cable 80 extends approximately transverse to the longitudinal axis X of the encoder in the region of the receptacle 36.

For an easy connection and change of the connection cable 80, there is provided, at one axial end of the housing 30, a closable opening 39 which is closed by a cover 40. The cover 40 completes sealing of the rotary encoder from all sides at least against penetration of dust and against influence of magnetic fields. With the cover 40 being removed, either the manufacturer of the encoder or the user can connect the cable 80 to the connection element 8.1 of the plug connector 8 and with the device 15. The housing 30 is so formed that only the connection element 8.1 is accessible from outside when the cover 40 is removed. Even with the cover 40 being removed, the electrical component 7 on the printed circuit board 6 and the board 6 itself are still covered by the housing 30.

In order to insure an easy connection of the shaft 1 of the angular encoder to the rotatable body 100, the screw 2 is also made accessible, with the cover 40 being removed.

The strain-relief device 15 is completely located within the radial outer profile of the housing 30 and is spaced from both the radial profile of the base 3 and the radial profile of the housing 30. The advantage of such location of the strain relief device 15 consists in that the connection cable 80 can be arbitrary bent in a region of the encoder between the device 15 and the outer profile of the housing 30. As a result, either radial or axial exit of the connection cable 80 can be arbitrary selected. In order to be able to strain-relieve the connection cable 80, the cable 80 should be spaced from the outer profile of the housing 30 by a distance corresponding to a minimal allowable or possible bending radius of the cable 80.

Figure 3:
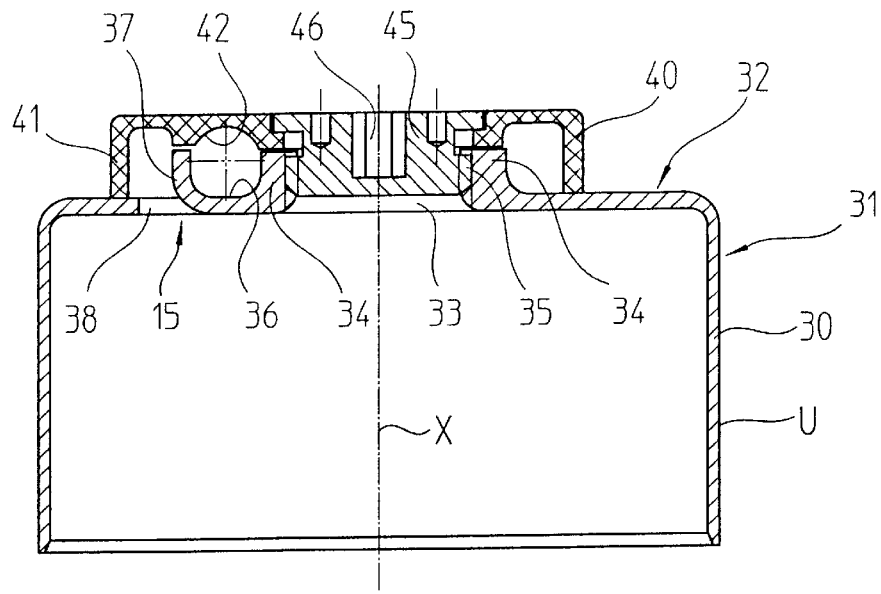
FIG. 3 a cross-sectional view of the housing of the rotary encoder shown in FIGS. 1–2.
Figure 4:
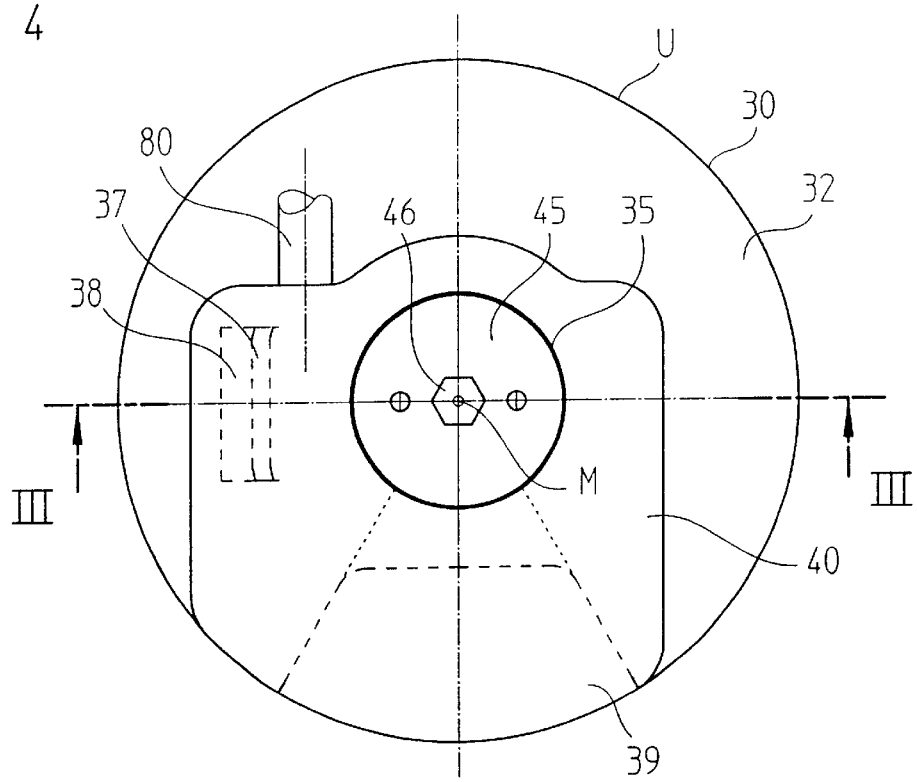
FIG. 4 a plan view of the housing shown in FIG. 3.

As shown in FIGS. 3–6, the encoder housing has a pot shape. The first embodiment of the encoder housing, which is designated generally with a reference numeral 30, is shown in FIGS. 3–4. The housing 30 has a side wall 31, which is shaped as a hollow cylinder, and a rear wall 32 that forms the bottom of the hollow cylinder. A plurality of openings 33, 38, 39 is formed in the rear wall 32 of the housing 30. Their shapes and functions will be discussed further below.

The opening 39 is located off-center and extends up to the circumference U of the rear wall 32. The opening 39 is located completely outside of the center M of the rear wall 32. Therefore, the contour of the opening 39 does not enclose the center M of the rear wall 32.

As it has already been discussed above, the opening 39 provides access to the electrical connection element 8.1 of the plug connector 8 or any other connector of a rotary encoder, which is provided in the housing 30 behind the opening 39. The end of the cable 80, which is provided with a mating electrical connection element 8.2, is introduced into the housing 30 through its opening 39, whereby an electrical connection of the rotary encoder is completed.

A further off-center opening 38 is formed in the rear wall 32 of the housing 30 by flanging a section 37 of the rear wall 32. The section 37 which represents a web, is located adjacent to a passage 34 located centrally in the rear wall 32. The passage 34 is formed by a hollow cylindrical section extending transverse to the rear wall 32 and an axis of which coincides with the axis X. This means that the opening 33, which is defined by passage 34 is concentric with the circumference U of the rear wall 32.

The central opening 33 permits to operate the screw 2 which connects the shaft 1 with the code disc 4 mounted thereon with the rotatable body 100 (please see FIG. 1).

The receptacle 36 is provided between the outer circumference of the passage 34 and the web 37. A section of the connection cable 80 of the rotary encoder is clamped in the receptacle 36. As it has already been discussed above, the receptacle 36 forms part of the strain-relief device 15 which prevents the force, which acts on cable 80 outside of the housing 30, from acting on the electrical plug connector 8.

The section of the cable 80, which is received in the receptacle 36, is surrounded by a sleeve 81, formed as a crimp sleeve from an electrically conductive material. The sleeve 81 is connected with the sheath of the cable 80. In this way, the connection cable 80 is electrically connected with the housing 30 which, preferably, is also formed of an electrically conductive material.

It is also possible to arrange a strain-relief device, i.e., means for securing the connection cable 80 in the housing 30, behind the, accessible from outside, closable opening 39 which also serves for accessing the plug connector and escalated in the housing 30. In this case, the opening 39 of the housing 30 needs to be correspondingly formed.

The openings 33, 38, 39 in the rear wall 32 of the housing 30 are closed by the cover 40 in order to protect the housing 30 from penetration of the dust and from the influence of electromagnetic fields. In order to provide for a sealing engagement of the cover 40 and the rear wall 32 of the housing 30, the side edges 41 of the cover 40 extend up to the rear wall 32 or up to the side wall 31 of the housing.

The cover 40 is secured to the rear wall of the housing 30 with a fastening screw plug 45 that extends through the central opening 33 of the cover 40 and which is screwed in the passage 34 provided with an inner thread 35. The operational section 46 of the screw plug 45 can be operated with the same tool as the screw 2 which is located behind the opening 33.

The cover 40, as it can particularly be seen in FIG. 4, is located eccentrically with respect to the center M of the rear wall 32, which center M lies on the axis X of the rotary encoder. In this way, the cover 40 is able to cover the off-center openings 38, 39 in the rear wall 32. At the same time, the cover 40 is secured to the rear wall 32 in its center M with a screw plug 45. It has been determined that the attachment of the cover 40 to the rear wall 32 in its center results in a vibration-free attachment of the cover 40 to the rear wall 32. A vibration-free connection of the cover 40 with the housing 30 is further enhanced by a large-surface engagement area of the fastening screw plug 45 with the inner thread 35. This results from a corresponding large size of the opening 33, which is formed in the rear wall 32, and a correspondingly large length of the inner thread 35 which can exceed, in this way, the thickness of the rear wall 32.

For spacial securing of the cover 40 on the rear wall 32 before the screw plug 45 is screwed into the inner thread 35 of the passage 34, there is provided a special formation 42 in the side of the cover 40 adjacent to the rear wall 32. The formation 42 forms part of the cable sleeve which is received in the receptacle 36.

In accordance with the advantageous embodiment of the cover 40, which is shown in FIGS. 3–4, the fastening screw plug 45 is retained on the cover 40 without a possibility of being lost. To this end, there is provided on the cover 40 a retaining ring in which the fastening screw is received with a possibility of rotation but is prevented from axial displacement relative to the cover 40.

The securing of the cover 40 on the rear wall 32 need not necessarily be effected by securing the fastening screw plug 45 in the associated passage 34. Instead, e.g., a bayonet connection can be used for securing the cover 40 on the rear wall 32.

Finally, it is not absolutely necessary that the openings 33, 38, 39 be formed in the rear wall 32 of the housing 30 as separate openings. Thus, two or even all three openings can be combined in one large opening. A dot line in FIG. 4 shows the combination of the central opening 33 with one of the off-center openings (opening 39) in an eccentric, with respect to the center M of the rear wall 32, opening.

Figure 5:
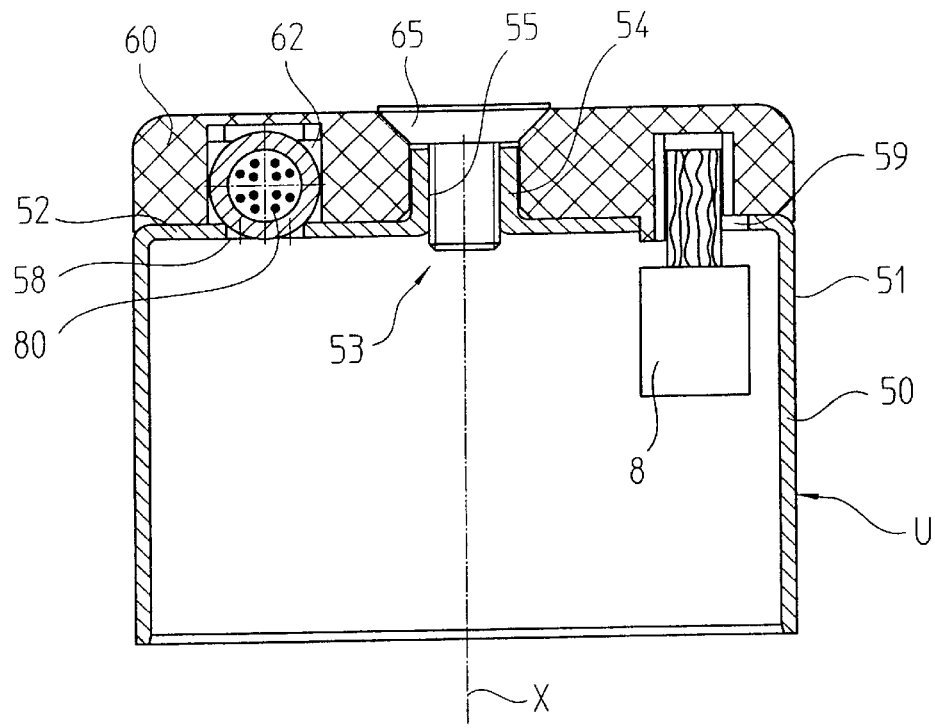
FIG. 5 a cross-sectional view of a second embodiment of a housing of a rotary encoder according to the present invention.
Figure 6:
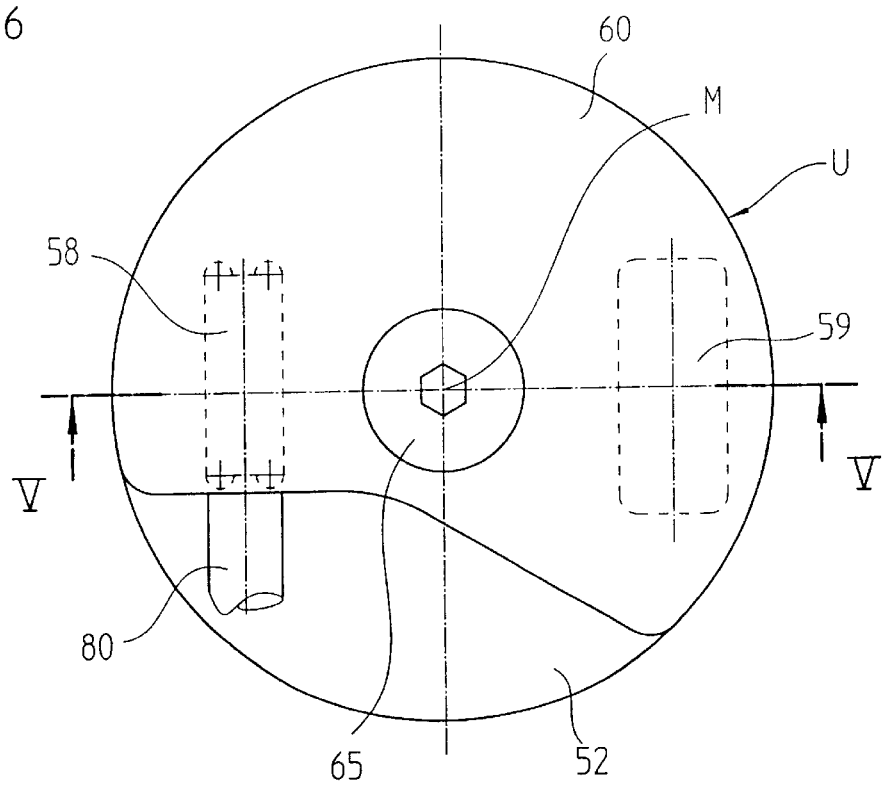
FIG. 6 a plan view of the housing shown in FIG. 5.

FIGS. 5–6 show a modified embodiment of the housing shown in FIGS. 1–4. As in the embodiment of the housing shown in FIGS. 1–4, the housing 50 of the rotary encoder has a pot shape and has a hollow cylinder-shaped side wall 51 and a circular rear wall 52 that forms the bottom of the hollow cylinder defined by the side wall 51. The central opening 53 in the rear wall 52 is defined by a passage 54. The passage 54 is formed as a hollow cylindrical section projecting from the rear wall 52. The passage 54 is provided with an inner thread 55.

In the embodiment of the rotary encoder housing shown in FIGS. 5–6, the central opening 53 has a double function. On one hand, it provides access to connection means which connects an encoder shaft with a code disc mounted thereon with a to-be-measured rotary body (in a manner identical to that shown in FIG. 1 but not shown in FIGS. 5–6). On the other hand, it forms an attachment point for securing a cover 60 on the rear wall 52.

In the rear wall 52, there is provided an off-center, with respect to the center M of the rear wall 52, opening 59. A connection cable 80 is introduced into the housing 50 through the opening 59 for connecting the cable 80 with the plug connector 8 located in the housing 50.

Another off-center opening 58 in the rear wall 52 serves for forming a strain-relief device. The opening 58 is formed by notching and is so dimensioned that it can formlockingly receive an electrically conductive sleeve (in particular a crimp sleeve) of the connection cable 80. Due to the fact that the cable 80 is formlockingly received, in the region of the electrically conductive sleeve, in the opening 58, the transmission of forces, which act on the cable 80, to the plug connector 8 is prevented. The cable 80 is led from the opening 58 to the opening 59 which is located opposite the opening 58. The opening 59 forms a passage for a connection electrical plug component which is secured at an end of the cable 80 and is connectable with the plug connector 8.

The attachment of the cover 60 to the housing 50 is effected, as in previously described embodiment, with a fastening screw plug 65 that is screwed in the passage 54 provided with the inner thread 55.

As in the previously described embodiment, the cover 60 is located eccentrically with respect to the center M of the rear wall 52 and covers only a portion of the rear wall 52. The cable 80 can be easily introduced into and withdrawn from the housing 50. However, the openings 53, 58, 59 in the rear wall 52 are all covered.

The embodiment of the rotary encoder housing 50, which is shown in FIGS. 5–6, differs from that of FIGS. 1–4 in that the formation 62 in the cover 60, in which the cable electroconductive sleeve is received, is formed as a chamber which so receives the cable sleeve, radially and axially, that its axial displacement along the connection cable is prevented. That is why the formation 62 forms an important component of the strain-relief device.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and the scope of the present invention as defined by the appended claims.

What is claimed is:

1. A rotary encoder, comprising:
a housing having a wall which forms a bottom of the housing and has a center and at least one opening;
a cover for closing the at least one opening, the housing wall having an attachment region which encloses the wall center and has at least one attachment point at which the cover is attached to the housing wall; and
a fastening element for securing the cover to the housing wall and rotatable with respect to the attachment region to provide for connection of the fastening element with the attachment point whereby the cover becomes secured to the housing wall.

2. A rotary encoder as set forth in claim 1, wherein the encoder further comprises a shaft, and connection means for connecting the shaft with a to-be-measured body and located behind the at least one opening for being actuated therethrough, and wherein the fastening element covers the at least one opening.

3. A rotary encoder as set forth in claim 2, wherein the at least one opening is formed as a circular opening defined by a hollow cylindrical section shaped out of the housing wall, the shaped-out hollow cylindrical section defining an attachment point for the fastening element and being provided with one of an inner thread and an outer thread.

4. A rotary encoder as set forth in claim 3, wherein the fastening element is formed as a screw plug provided with one of an outer thread and an inner thread complementary to the one of an inner thread and an outer thread of the hollow cylindrical section, respectively.

5. A rotary encoder as set forth in claim 2, wherein the connection means for connecting the encoder shaft with the to-be-measured body and the fastening element comprise same actuatable means whereby they can be actuated with a same tool.

6. A rotary encoder as set forth in claim 1, wherein the housing wall has a further opening enclosed in the attachment region of the housing wall, and wherein the encoder further comprises an electrical plug connector located behind the further opening of the housing, whereby a connection cable is connectable with the plug connector by being introduced through the further opening.

7. A rotary encoder as set forth in claim 1, wherein the encoder further comprises a shaft and connection means for connecting the shaft with a to-be-measured body and located behind the at least one opening for being actuated therethrough, wherein the housing wall has a further opening enclosed in the attachment region of the housing wall, wherein the encoder further comprises an electrical plug connector located behind the further opening and accessible from outside of the housing, whereby a connection cable is connectable with the plug connector by being introduced through the further opening, and wherein the at least one opening and the further opening are combined in a single opening.

8. A rotary encoder as set forth in claim 6, further comprising a device for strain-relief of the connection cable, the strain-relief device being covered by the cover and being accessible when the cover is removed.

9. A rotary encoder as set forth in claim 7, further comprising a device for strain-relief of the connection cable, the strain-relief device being covered by the cover and being accessible when the cover is removed.

10. A rotary encoder as set forth in claim 8, wherein the strain-relief device comprises a receptacle located in the housing wall and in which a section of the connection cable is clamped.

11. A rotary encoder as set forth in claim 9, wherein the strain-relief device comprises a receptacle located in the housing wall and in which a section of the connection cable is clamped.

* * * * *